United States Patent
Potter et al.

(10) Patent No.: US 6,857,856 B2
(45) Date of Patent: Feb. 22, 2005

(54) TAILORED ATTACHMENT MECHANISM FOR COMPOSITE AIRFOILS

(75) Inventors: Brian Potter, Palm Beach Gardens, FL (US); Brad Carter, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 10/646,257

(22) Filed: Aug. 22, 2003

(65) Prior Publication Data

US 2004/0062655 A1 Apr. 1, 2004

Related U.S. Application Data

(60) Provisional application No. 60/414,060, filed on Sep. 27, 2002.

(51) Int. Cl.[7] .................................................. F01D 5/30
(52) U.S. Cl. ..................... 416/229 A; 416/230; 416/248
(58) Field of Search ............................ 416/229 A, 248, 416/230

(56) References Cited

U.S. PATENT DOCUMENTS

| | | | |
|---|---|---|---|
| 3,731,360 A | | 5/1973 | Stone, Jr. |
| 3,752,600 A | | 8/1973 | Walsh et al. |
| 3,756,745 A | | 9/1973 | Alver et al. |
| 3,943,020 A | * | 3/1976 | Ashton et al. ............. 156/156 |
| 4,037,990 A | * | 7/1977 | Harris ..................... 416/220 R |
| 4,040,770 A | | 8/1977 | Carlson |
| 4,343,593 A | | 8/1982 | Harris |
| 4,417,854 A | | 11/1983 | Cain et al. |
| 4,655,687 A | | 4/1987 | Atkinson |
| 5,240,375 A | | 8/1993 | Wayte |
| 5,292,231 A | | 3/1994 | Lauzeille |
| 5,340,280 A | * | 8/1994 | Schilling ................ 416/229 A |
| 5,791,877 A | | 8/1998 | Stenneler |
| 6,004,101 A | | 12/1999 | Schilling et al. |
| 6,290,466 B1 | | 9/2001 | Ravenhall et al. |

* cited by examiner

*Primary Examiner*—Ninh H. Nguyen
(74) *Attorney, Agent, or Firm*—Christopher & Weisberg, P.A.

(57) ABSTRACT

A turbine engine composite blade attachment mechanism is provided, including a blade having an airfoil section, a neck section, and a root section. The root section includes a continuous loop integral with the blade and branching out from the neck section to completely surround a root insert. The blade includes a plurality of fibers which extend from the airfoil section through the neck and around the core. The root section and neck are enveloped by a jacket having a thickness which increases from the distal side surface of the loop to the neck portion, and has an inner contour substantially aligned with the proximal side surface contour of the loop and the core. The jacket and root are disposed inside a rotary disk cavity such that when tensile loading is applied, the neck width is maintained and compressive transverse loads may be applied to the fibers to prevent lamination thereof.

24 Claims, 4 Drawing Sheets

NO LOAD  FIG. 2D

LOAD  FIG. 2E

TAILORED ATTACHMENT MECHANISM FOR COMPOSITE AIRFOILS

CROSS-REFERENCE TO RELATED APPLICATION

This application is related to and claims priority to U.S. Provisional Patent Application Ser. No. 60/414,060, filed Sep. 27, 2002, entitled TAILORED ATTACHMENT MECHANISM FOR COMPOSITE AIRFOILS, the entirety of which is incorporated herein by reference.

STATEMENT REGARDING FEDERALLY SPONSORED RESEARCH OR DEVELOPMENT n/a

FIELD OF THE INVENTION

The present invention relates to turbomachinery and gas turbine engines, namely, composite blade attachment mechanisms and rotor assemblies.

BACKGROUND OF THE INVENTION

Gas turbine engine blades typically have dovetails or roots carried by a slot in a metal rotary disk or drum rotor. A typical blade 1 is displayed in FIG. 1, showing an airfoil section 2, and root section 3. The root section 3 provides the means by which the blade is attached to the rotor disk or other similar component of a gas turbine engine or comparable piece of turbomachinery. The blade 1 may also include an interface 4 between the airfoil 2 and root 3, to conform to the rotor disk or other attachment mechanism.

Composite blades have many advantages over blades made with other materials, such as current metal alloys. They have a high strength to weight ratio, which allows for the design of low weight parts that can withstand the extreme temperatures and loading of turbomachinery. They can also be designed with parts with design features not possible with other materials (such as extreme forward sweep of compressor blading). A major drawback of composite blades is that their strength is essentially unidirectional. Despite having a relatively high uniaxial tensile strength, the composite materials are fragile and weak under compression or shear. However, in gas turbines, the blades are usually under extremely high tensile loads. Problems usually arise with regard to the transfer of such loads into the disk. Since the blades are often made of a laminated fiber or filament reinforced composite material, and the disks are typically made of metal, the transfer of loads between the two can lead to damage of the fibers, or even worse, delamination of the composite materials.

FIGS. 2a–2c illustrate the problem, where there is shown three separate views of an example of a composite blade root. First there is an unloaded blade 10a in FIG. 2a. Then, when tensile loading T is applied as shown, there is the case of loaded blade 10b in FIG. 2b, where shear stresses have caused failure of the root structure. Or, there is the case of loaded blade 10c in FIG. 2c, where the resulting stresses from tensile load T as applied to the blade from the surrounding disk cavity (not shown) have caused delamination of the blade. The challenge therefore, is to provide an optimum load path between the composite blade structural fibers and the surrounding disk.

Previously, one of the technology barriers for high performance composite blades has been designing an attachment scheme that would utilize the strengths of composite materials to prevent the failure illustrated in FIGS. 2b–2c.

As demonstrated in FIGS. 2a–2b, a critically important area is the blade attachment region or "neck" portion 11 of the blade, where the thicker root transitions out to the relatively thin airfoil section above. It is this portion which tends to delaminate or otherwise fail, when the blade is loaded and the resulting stresses are applied to the root and interface between the root and disk. One reason for such failures is that the disk lugs tend to separate due to both the centrifugal loads acting on the disk and blade. FIG. 2d illustrates another example of a blade 15 inserted into a disk 16, under no loading. The disk lugs 17 around the neck 18 of the blade 15 define a gap $G_0$ that conforms to the shape of the blade 15. In FIG. 2e, the blade of FIG. 2d is shown under centrifugal axial loading, where the gap has increased in size to $G_L$. Although this geometrical change in the disk geometry is slight (the dimensions portrayed in FIGS. 2d–e are exaggerated for effect), it no longer conforms to the shape of the blade. The effect of this slight increase in gap induces transverse tension and/or shear stresses.

Since composite materials have little ability to handle transverse tension or shear loading, this will result in failure of the composite blade as in blade 10c once the intralaminar tension or shear stresses exceed the ultimate intralaminar stress capabilities of the composite. An example would be uni-directional Kevlar composite, having an ultimate intralaminar stress capability of about 6 ksi.

Since composite blades are very useful in gas turbine engines, it is desirable to provide a tailored attachment mechanism of composite airfoils, that both takes advantage of the relatively high tensile strength of composites, and minimizes the disadvantage of the relatively low shear and transverse tension strength of composites.

SUMMARY OF THE INVENTION

In a first embodiment of the present invention, a turbomachinery blade is provided, having a root insert, and an airfoil having a first end and a second end. The second end forms a loop enclosing the root insert. The loop includes two arms in apposition to form a neck distal to the second end from the root insert. A jacket is disposed around the neck to prevent separation of the opposing arms.

In another embodiment of the present invention, a gas turbine engine blade assembly is provided, having a composite blade having an airfoil portion, a neck portion and a root portion. The root portion includes a single root insert enveloped by two distinct arms integral to and extending from the neck portion and forming one continuous loop around the core. A jacket is disposed around the root portion and the neck portion.

In yet another embodiment of the present invention, a turbomachinery blade assembly, is provided, having a composite blade having a proximal airfoil portion and a distal neck portion. The blade includes a number of fibers which form a continuous loop integral to the blade distal to the neck portion, and a core insert having a distal surface contour and a proximal surface contour. The core insert is circumscribed by the loop. A jacket having an outer surface and an inner surface encloses the neck portion and the loop. The inner surface includes a surface contour substantially aligned with the proximal surface contour of the core insert.

And in another embodiment of the present invention, a gas turbine engine blade assembly is provided, including a root insert member and a blade member having a proximal airfoil portion, an intermediate neck portion, and a distal root portion. The distal root portion forms a continuous loop around the root insert member. In addition, a rotor member defines a cavity for receiving the blade member. The assembly also includes a jacket means for coupling the blade member to the rotor member, the jacket means being disposed inside the cavity around the intermediate neck portion and distal root portion of the blade member.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 2d illustrates a blade inserted into a disk, under no loading;

FIG. 2e illustrates the blade of FIG. 2d, under centrifugal axial loading;

DETAILED DESCRIPTION OF THE INVENTION

As used herein, a "jacket" shall mean any outer layer type structure enveloping an inner structure, such as a sheath, cladding, ring, or coating. Also as used herein, a "shim" shall mean any piece of material, used to fill gaps, make something level, or adjust something to fit properly, or any material placed between two parts to make the parts continuously connect or fit. Both a jacket or shim may be made of any material.

Also as used herein, a "blade" shall mean any structure used in turbine engines, turbomachinery, aircraft, mobile or stationary powerplants, or other machines or devices which include a structure having surfaces which interact with fluid flows. Blades shall include vanes, airfoils, rudders, and any other aerodynamic, hydrodynamic or control surface structures.

Also as used herein, the term "circumscribe" shall refer to one element enclosing, surrounding, or abutting against another element to as to be substantially in contact with the outer surface of the circumscribed element, but not necessarily all of such outer surface.

Figure 1:
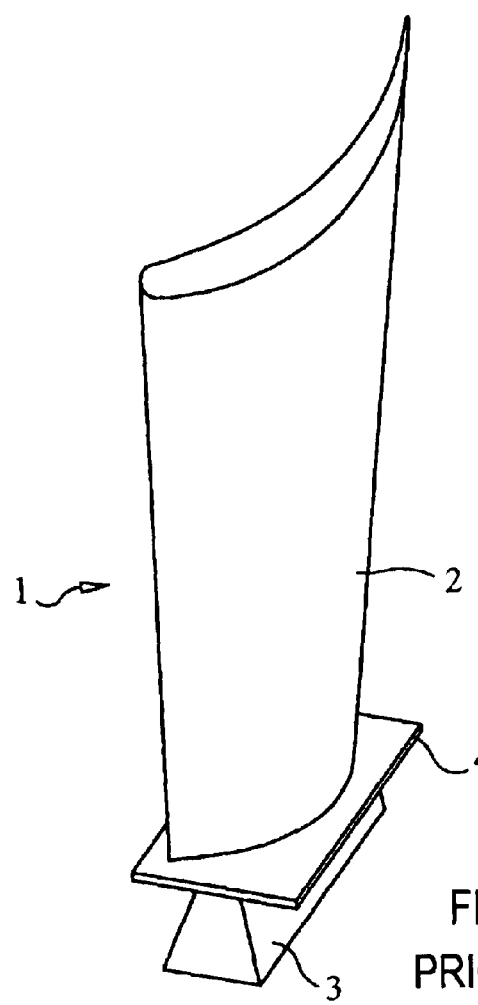
FIG. 1 illustrates a typical gas turbine engine blade.
Figure 2A:
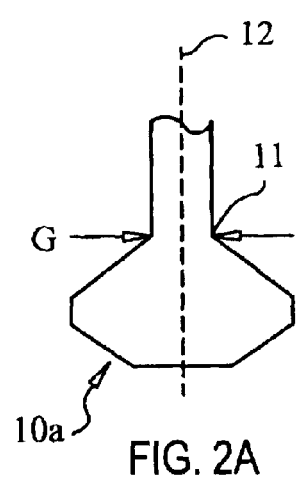
FIGS. 2a–2c illustrate three views of a composite turbine blade root, showing the root under a tensile load.
Figure 2B:
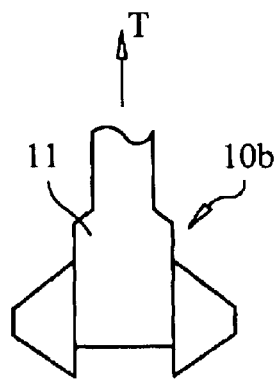
Figure 2C:
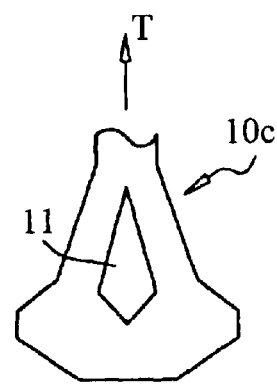
Figure 3:
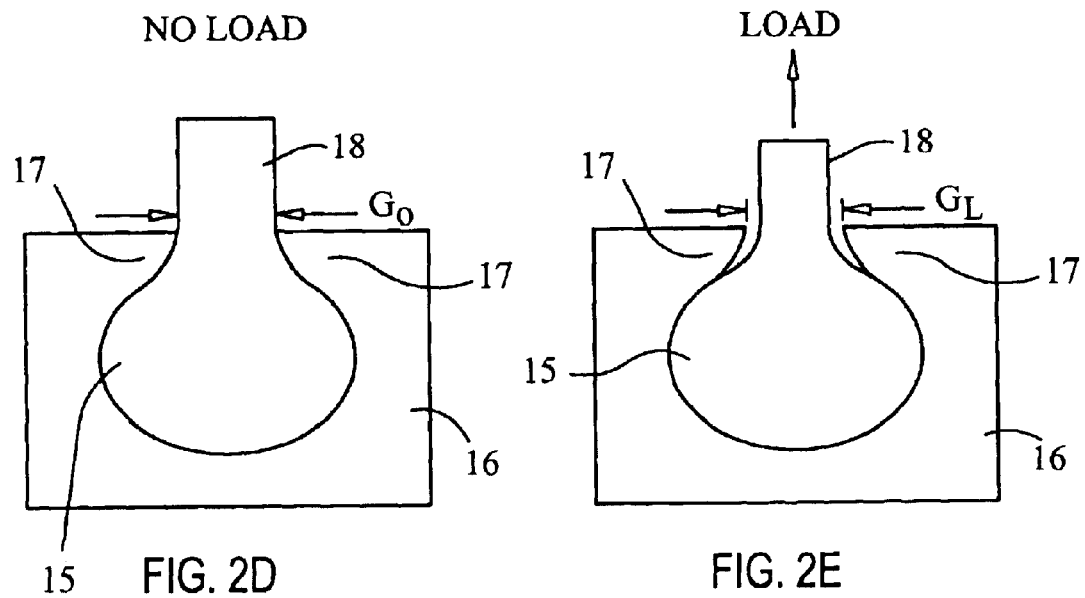
FIG. 3 is a schematic of the attachment principles employed in the present invention.
Figure 3:
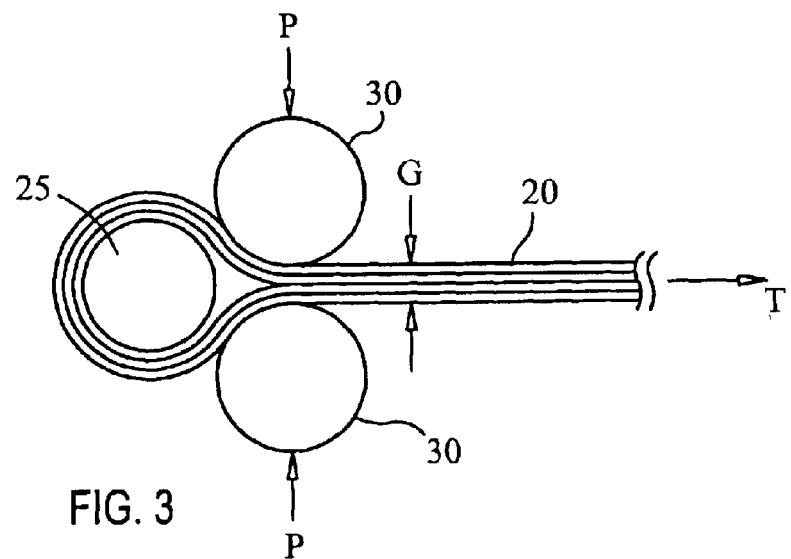

FIG. 3 is a simplified schematic of the attachment principles employed in the present invention. Since composite blades are generally made up of a number of longitudinal layers having a relatively high tensile strength, the present invention takes advantage of this feature in tailoring an attachment mechanism for gas turbine blades. FIG. 3 shows a schematic cross-section of a blade having a number of layers 20 extending along a longitudinal axis 21. The layers 20 may be fibers, fiber composites, fiber sheets, or any group of elements which have a layered structure stacked substantially parallel to the longitudinal axis 21 of the blade. The layers are wrapped around an insert 25. The insert 25 thereby provides the means by which the composite layers 20 are anchored to the rotor disk, such that a tensile load T, as shown, is transmitted throughout the length of the layers 20, into cylinders 30 as insert 25 cannot pass between cylinders 30.

However, this simplified representation neglects the increase in gap G shown in FIG. 3, which is due to the elastic deformation caused by centrifugal loading T on the blade and its surrounding disk (not shown). In practice it is necessary to maintain this gap unchanged in order to prevent the development of transverse tension or intralaminar shear in the composite blade. This gap can be maintained by means of a "jacket" that is designed to move together with the blade as the disk lugs move apart. The jacket can pinch or induce transverse compression (such as along arrows P shown in FIG. 3) into the blade laminate, although this is not required providing gap G is maintained.

Figure 4:
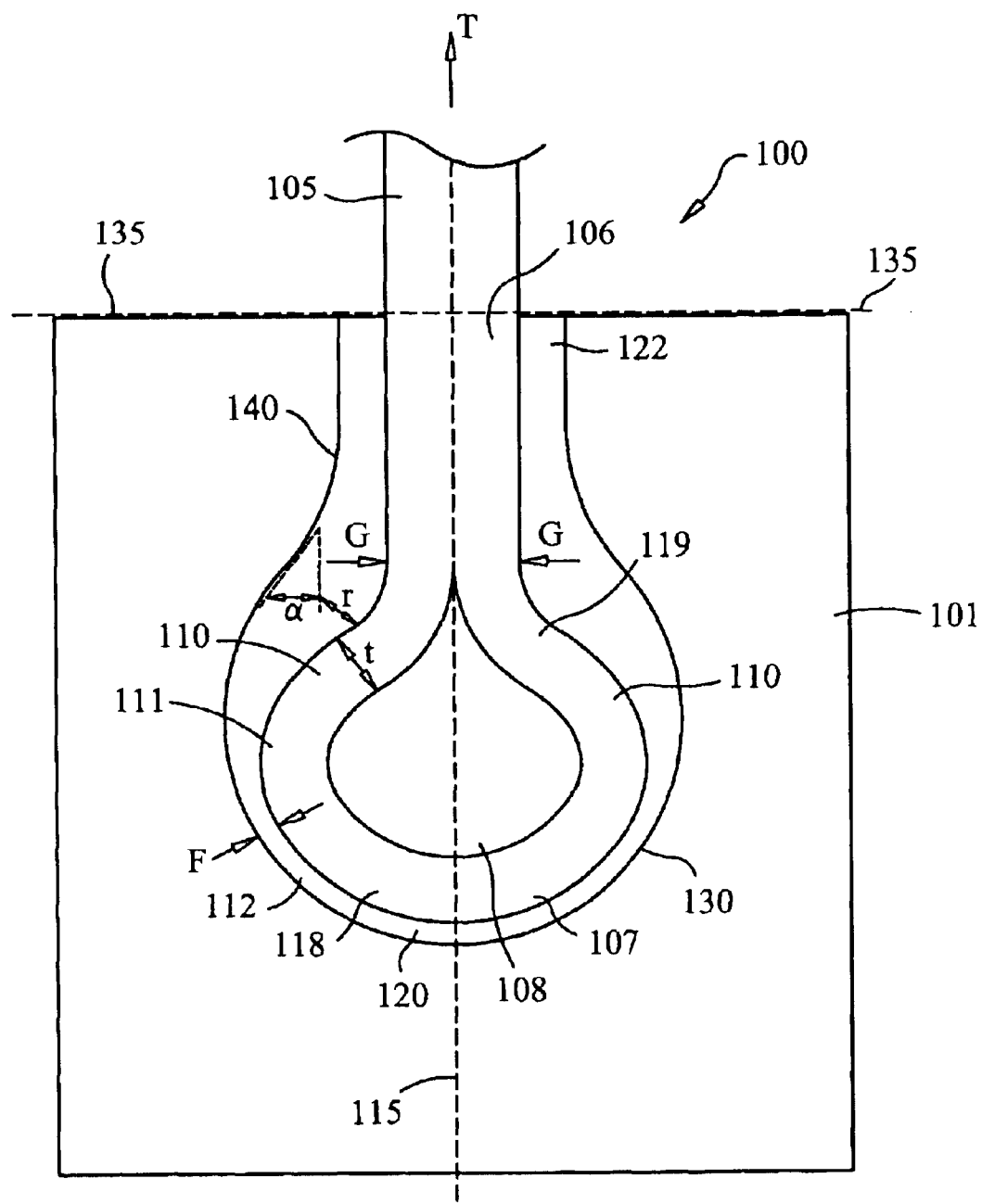
FIG. 4 is a cross section of a turbine blade root attachment mechanism in accordance with the principles of the present invention.

FIG. 4 illustrates the foregoing principles in practice in a gas turbine blade. FIG. 4 is a cross section of a blade root attachment mechanism in accordance with the principles of the present invention. The lower portion of blade 100 is shown inserted into a rotor disk 101. The blade 100 includes an airfoil portion 105, a neck portion 106 and a root portion 107, the root portion 107 having a single insert 108 enveloped by two distinct arms 110 integral to and extending from the neck portion 106 and forming one continuous loop 1111 around the core 108 as shown. A jacket 112 is disposed around the root portion 107 and the neck portion 106. The entire blade is symmetrically oriented about a longitudinal axis 115 along which a tensile load T is applied in the direction shown.

Figure 4A:
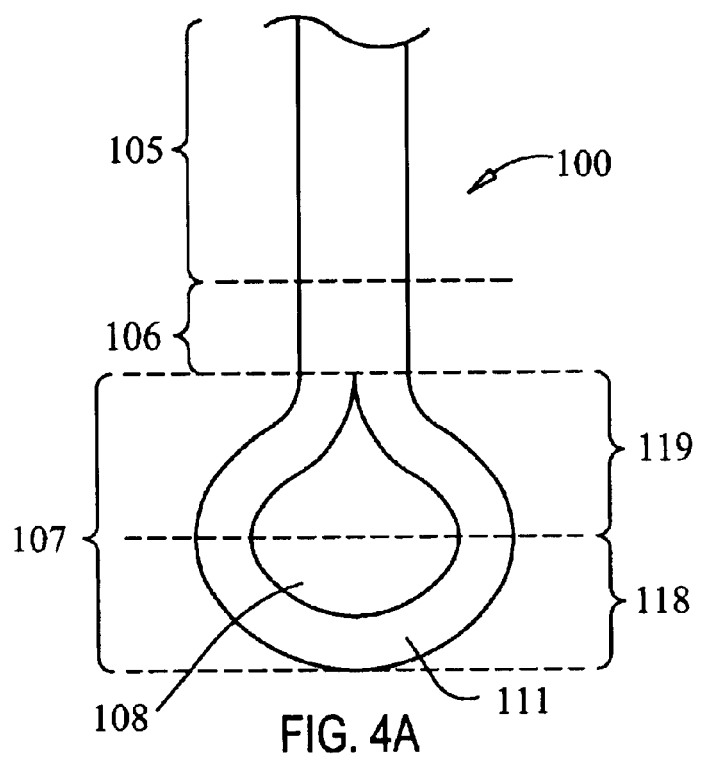
FIG. 4A is a cross-section of only the turbine blade displayed in the turbine blade root attachment mechanism of FIG. 4.

FIG. 4A is a cross-section of only the blade 100 displayed in the blade root attachment mechanism of FIG. 4, showing the various sections of the airfoil portion 105, neck portion 106, and root portion 107. As clearly shown in FIG. 4A, the loop 111 of the root portion 107 completely envelops and circumscribes the inner core 108, which in this case is tear-drop shaped. The loop 111 includes a distal half 118 distal to the airfoil portion 105 and a proximal half 119 proximal to the airfoil.

Figure 4B:
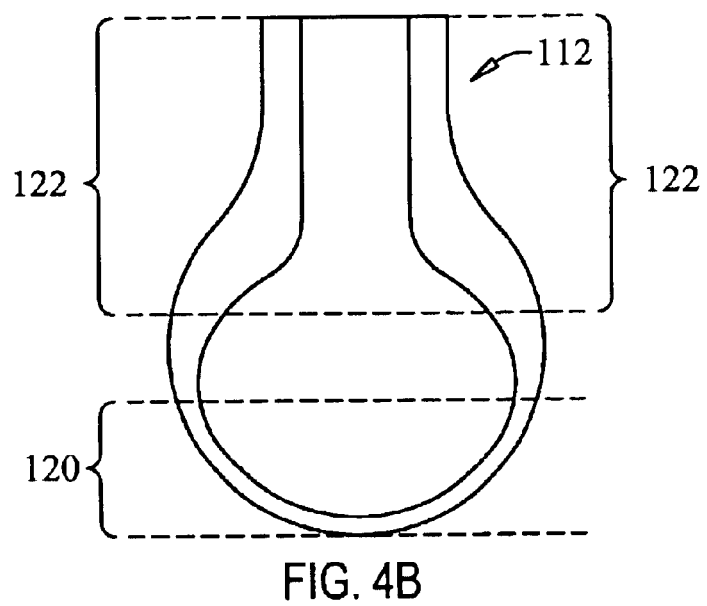
FIG. 4B is a cross-section of only the jacket displayed in the turbine blade root attachment mechanism of FIG. 4.

FIG. 4B is a cross-section of only the jacket 112 displayed in the blade root attachment mechanism of FIG. 4. The jacket 112 is substantially U-shaped and includes a central portion 120 in apposition with the distal half 118 of the loop, as shown in FIG. 4. The central portion 120 has a thickness that is substantially less than two end portions 122 disposed against opposite sides of the neck portion 106. Each the two end portions 122 of the jacket 112 have a thickness which gradually increases from the thickness of the central portion 120 as the two end portions 122 extend over the proximal half 119 of the loop 111, as shown in FIG. 4.

In FIG. 4, tensile load T is indicated only an approximation of the resulting stresses and loads on the blade 100 due to a number of aerodynamic and centrifugal forces generated by the operation of the turbine engine. It is not meant to present an exact picture of blade loading, but does represent an overall tensile load that is generally applied to blades under these conditions.

As shown in FIG. 4, the rotary disk 101 defines a blade-receiving cavity 130 and an outer surface 135. The cavity 130 is bounded by the outer surface 135, wherein the neck portion 106, the root portion 107, and the jacket 112 are all disposed inside the cavity 130. In one regard, jacket 112 functions as a shim that fills the space between the blade-receiving cavity 130 and the root and neck portions 107 and 106 of the blade 105. This anchors the blade 105 to the rotor member 101. For purposes used herein, the rotor disk member 101 need not be a rotary disk per se, but may be any element in a turbine engine or other similar piece of turbomachinery, at the compressor or turbine stage, wherein a blade such as blade 100 is attached.

The jacket 112 acts as more than just a shim or gap-filling element. In the embodiment shown in FIG. 4, the disk 101 circumscribes the jacket 112 such that when tensile loading T is applied to the blade 100 along longitudinal axis 115, the jacket 112 maintains the gap G and potentially applies compressive loads to the gap G along the neck portion 106 normal to the longitudinal axis 115 as shown. It can be clearly seen in FIG. 4 that the jacket 112 applies compressive loads G to the neck portion 106 at a point inside the cavity 130 beneath the outer surface 135 of the disk 101. Furthermore, the disk 101 circumscribes the jacket 112, and the jacket 112 circumscribes the root portion 107 and neck portion 106 in such a way that when tensile loading T is applied to the blade 100, the jacket 112 hinders the expansion of the neck portion 106 normal to the longitudinal axis 115 at the compression point or gap defined by the arrows G as shown. Thus, as centrifugal loads T tend to widen gap G as the disk lugs 140 move apart, the jacket 112 deforms and deflects to conform to the outer contours of the root portion 107 and neck portion 106 of the blade, so as to maintain gap G. By maintaining this gap, the intralaminar shear and transverse tension forces in the blade are minimized or eliminated.

The particular dimensions of the jacket 112 and blade 100 are not limited to the ratios and proportions shown in FIG. 4, and are provided as an example only. FIG. 4 illustrates one possible configuration, where jacket 112 has a thickness "F" at its central portion 120. This thickness need not be very thin or very thick, and does not significantly affect the performance of the present invention. If the arms 110 have a thickness "t", then the thickness of the jacket 112 will be such that it generally conforms to the contours of the inner surface of cavity 101 and the outer surface of the root portion 107, where the radius of curvature "r" of the inner face of the upper portion 122 of jacket 112, proximate the interface of the root portion 107 and neck portion 6, is about equal to thickness t of the arms. The thickness t will vary depending on the particular composite blade, but radius r will generally be approximate to thickness t. Furthermore, the angle a shown as the slope of the outer surface of the jacket 112 at its thickest point will be in the range of 30 degrees plus or minus 10 degrees. This variation is required to accommodate differing rotor disk materials with differing stress capabilities (such as titanium, steel, etc.).

The composite may be made of a fiber reinforced laminar material. The fibers may be made of graphite, fiberglass, or Kevlar® brand synthetic fibers of the kind made by E. I. Du Pont De Nemours and Company. The resins may be epoxy or polyimide. The insert 108 may be round, elliptical, teardrop shaped as shown in FIG. 4, or some other suitable shape for restraining the blade in accordance with the present invention. The insert 108 and jacket 112 may be made of metal, metal alloy, plastic or polymer material.

The tailored attachment mechanism of the present invention is assembled and manufactured using industry standard techniques.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A turbomachinery blade, comprising:
    a root insert,
    an airfoil having a first end and a second end, the second end forming a loop enclosing the root insert, the loop having two arms in apposition to form a neck distal to the second end from the root insert, and
    a jacket disposed around the neck to prevent separation of the opposing arms.

2. The blade assembly of claim 1, wherein the blade is made of a fiber reinforced composite material.

3. The blade assembly of claim 2, wherein the root insert has a cross section that is teardrop shaped.

4. The blade assembly of claim 2, wherein the root insert has a cross section that is round.

5. The blade assembly of claim 1, wherein the jacket applies compressive loads to the neck.

6. A gas turbine engine blade assembly, comprising:
    a composite blade having an airfoil portion, a neck portion and a root portion, the root portion having a single root insert enveloped by two distinct arms integral to and extending from the neck portion and forming one continuous loop around the core, and
    a jacket disposed around the root portion and the neck portion.

7. The blade assembly of claim 6, wherein the loop includes a distal half that is distal to the airfoil portion and a proximal half proximal to the airfoil, and wherein the jacket is substantially U-shaped and includes a central portion in apposition with the distal half of the loop, the central portion having a first thickness, and wherein the jacket includes two end portions disposed against opposite sides of the neck portion, the end portions having a thickness substantially greater than the first thickness.

8. The blade assembly of claim 7, wherein each the two end portions of the jacket have a thickness which gradually increases from the first thickness as the two end portions extend over the proximal half of the loop towards the airfoil portion.

9. The blade assembly of claim 6, further comprising:
    a rotary disk defining a blade-receiving cavity, the disk having an outer surface, the cavity being bounded by the outer surface, wherein the neck portion, the root portion and the jacket are disposed inside the cavity.

10. The blade assembly of claim 9, wherein the disk circumscribes the jacket such that when tensile loading is applied to the blade along a longitudinal axis extending from the root portion to the airfoil portion, the jacket applies compressive loads to the neck portion normal to the longitudinal axis.

11. The blade assembly of claim 10, wherein the jacket applies compressive loads to the neck portion at a point inside the cavity beneath the outer surface of the disk.

12. The blade assembly of claim 9, wherein the disk circumscribes the jacket such that when tensile loading is applied to the blade along a longitudinal axis extending from the root portion, the jacket hinders the expansion of the neck portion normal to the longitudinal axis.

13. The blade assembly of claim 9, wherein the disk circumscribes the jacket such that when tensile loading is applied to the blade along a longitudinal axis extending from the root portion, the jacket hinders delamination of the neck portion.

14. The blade assembly of claim 6, wherein the blade is made of a fiber reinforced laminar material.

15. The blade assembly of claim 6, wherein the root insert has a cross-section that is teardrop shaped.

16. The blade assembly of claim 6, wherein the root insert has a cross-section that is round.

17. A turbomachinery blade assembly, comprising:
   a composite blade having a proximal airfoil portion and a distal neck portion, the blade comprising a plurality of fibers, the plurality of fibers forming a continuous loop integral to the blade distal to the neck portion,
   a core insert having a distal surface contour and a proximal surface contour, the core insert being circumscribed by the loop, and
   a jacket having an outer surface and an inner surface enclosing the neck portion and the loop, the inner surface having a surface contour substantially aligned with the proximal surface contour of the core insert.

18. The blade assembly of claim 17, wherein the plurality of fibers are substantially aligned along a longitudinal axis defined by a lengthwise span of the airfoil portion and neck portion, and further comprising:
   a rotary disk having an exterior surface normal to the longitudinal axis, the disk further defining a cavity and having a cavity surface, the cavity being bounded by the exterior surface and the cavity surface,
   wherein the neck portion, the loop, the core insert and the jacket are disposed inside the cavity distal to the exterior surface.

19. The blade assembly of claim 18, wherein the loop, the neck portion and the cavity surface define a space therebetween, and wherein the jacket fills the space.

20. The blade assembly of claim 18, wherein the plurality of fibers in the neck portion are substantially parallel and separate at a separation point to form the loop, the separation point being inside of the cavity and substantially distal to the exterior surface of the disk.

21. The blade assembly of claim 20, wherein the core insert has a cross-section that is round, oval or elliptical.

22. The blade assembly of claim 20, wherein the core insert has a cross-section that is teardrop shaped, having a rounded distal surface contour, and a pointed proximal surface contour.

23. A gas turbine engine blade assembly, comprising:
   a root insert member
   a blade member having a proximal airfoil portion, an intermediate neck portion, and a distal root portion, the distal root portion forming a continuous loop around the root insert member,
   a rotor member defining a cavity for receiving the blade member,
   a jacket means for coupling the blade member to the rotor member, the jacket means being disposed inside the cavity around the intermediate neck portion and distal root portion of the blade member.

24. The gas turbine engine blade assembly of claim 23, wherein the blade member is made of a composite material.

* * * * *